United States Patent [19]

Horowitz et al.

[11] 4,101,716
[45] Jul. 18, 1978

[54] USE OF HIGH SURFACE AREA MIXED METAL OXIDES OF MANGANESE AND CALCIUM IN ELECTROCHEMICAL PROCESSES

[75] Inventors: Harold S. Horowitz, Clark; John M. Longo, New Providence, both of N.J.

[73] Assignee: Exxon Research & Engineering Co., Linden, N.J.

[21] Appl. No.: 824,630

[22] Filed: Aug. 15, 1977

[51] Int. Cl.$^2$ .................. H01M 4/86; H01M 4/50
[52] U.S. Cl. ........................... 429/13; 429/224
[58] Field of Search .............. 429/224, 40, 206, 222, 429/13, 194

[56] References Cited

U.S. PATENT DOCUMENTS 4,049,790  9/1977  Horowitz .......................... 429/224

Primary Examiner—John H. Mack
Assistant Examiner—H. A. Feeley
Attorney, Agent, or Firm—Joseph J. Allocca

[57] ABSTRACT

Mixed metal oxides of the formula $CaMn_3O_6$, $CaMn_4O_8$ and $CaMn_7O_{12}$ are disclosed. They are useful in electrochemical processes. $CaMn_3O_6$ is a mixed valence composition whose formula may be written as $Ca[Mn_2^{3+}Mn^{4+}]O_6$. The compound is stable in $H_2$ to about 400° C. and in oxygen to approximately 925° C. $CaMn_4O_8$ is also a mixed valence composition whose formula may be written $Ca[Mn_2^{3+}Mn_2^{4+}]O_8$. This compound is stable in $H_2$ to about 250° C. and in $O_2$ to about 900° C. $CaMn_7O_{12}$ is a mixed valence composition whose formula may be written as $Ca[Mn^{4+}Mn_6^{3+}]O_{12}$. The compound is stable in $H_2$ to about 500° C. and in oxygen to approximately 950° C.

These materials may be prepared by a variety of standard ceramic techniques, among them being heating in oxygen a mixture of calcium oxide and manganese oxide or mixed calcium and manganese salts or calcium salt and manganese oxide, or calcium oxide and manganese salt.

Alternatively, solid solutions of mixed calcium and manganese carbonates may be decomposed to the compositions. The mixed calcium-manganese carbonate solid solutions are prepared by the precipitation from salt solution of the calcium and manganese by the addition of an excess of an appropriate carbonate ion source such as $(NH_4)_2CO_3$. The metal ion ratio in this salt solution is adjusted so that the resulting precipitate has the same stoichiometry as the desired oxide. The precipitate is calcined to yield the mixed metal oxide product described.

The compounds described have utility as primary battery cathodes and also find use as oxygen activating catalysts in applications such as partial oxidation; methanol decomposition and oxygen reduction at a fuel cell cathode.

14 Claims, 8 Drawing Figures

ELECTROCATALYTIC REDUCTION OF OXYGEN, CaMn$_4$O$_8$

USE OF HIGH SURFACE AREA MIXED METAL OXIDES OF MANGANESE AND CALCIUM IN ELECTROCHEMICAL PROCESSES

SUMMARY OF THE INVENTION

Mixed metal oxide compositions of the formula $CaMn_3O_6$, $CaMn_4O_8$ and $CaMn_7O_{12}$ are disclosed. They are useful in electrochemical processes. $CaMn_3O_6$ is a mixed valence composition whose formula may be written as $Ca[Mn_2^{3+}Mn^{4+}]O_6$. The compound is stable in $H_2$ to about 400° C. and in oxygen to approximately 925° C. $CaMn_4O_8$ is also a mixed valence composition whose formula may be written $Ca[Mn_2^{3+}Mn_2^{4+}]O_8$. This compound is stable in $H_2$ to about 250° C. and in $O_2$ to about 900° C. $CaMn_7O_{12}$ is a mixed valence composition whose formula may be written as $Ca[Mn^{4+}Mn_6^{3+}]O_{12}$. The composition is stable in $H_2$ to about 500° C. and in oxygen to approximately 950° C.

These materials may be prepared by a variety of standard ceramic techniques, among them being heating in oxygen, a mixture of calcium oxide and manganese oxide or mixed calcium and manganese salts or calcium salt and manganese oxide or calcium oxide and manganese salt.

Alternatively, solid solutions of mixed calcium and manganese carbonates may be decomposed to the compositions. The mixed calcium-manganese carbonate solid solutions are prepared by the precipitation from salt solution of the calcium and manganese by the addition of an excess of an appropriate carbonate ion source such as $(NH_4)_2CO_3$. The metal ion ratio in this salt solution is adjusted so that the resulting precipitate has the same stoichiometry as the desired oxide. The precipitate is calcined to yield the mixed metal oxide product described.

The compounds described have utility as primary battery cathodes and may also find use as oxygen activating catalysts in applications such as partial oxidation, methanol decomposition and oxygen reduction at a fuel cell cathode.

According to the present invention, there is provided an electrical energy storage device which has a cathode active material selected from the group consisting of $CaMn_3O_6$, $CaMn_4O_8$ and $CaMn_7O_{12}$. The anode in the electrical energy storage device of the present invention is a metal selected from the group consisting of cadmium, zinc, lead, lithium, sodium and potassium. The electrolyte useful in the present invention includes aqueous electrolyte such as aqueous solutions of potassium hydroxide, sodium hydroxide and ammonium chloride and nonaqueous organic electrolytes such as propylene carbonate solutions of alkali metal salts.

DESCRIPTION OF THE INVENTION

Figure 1:
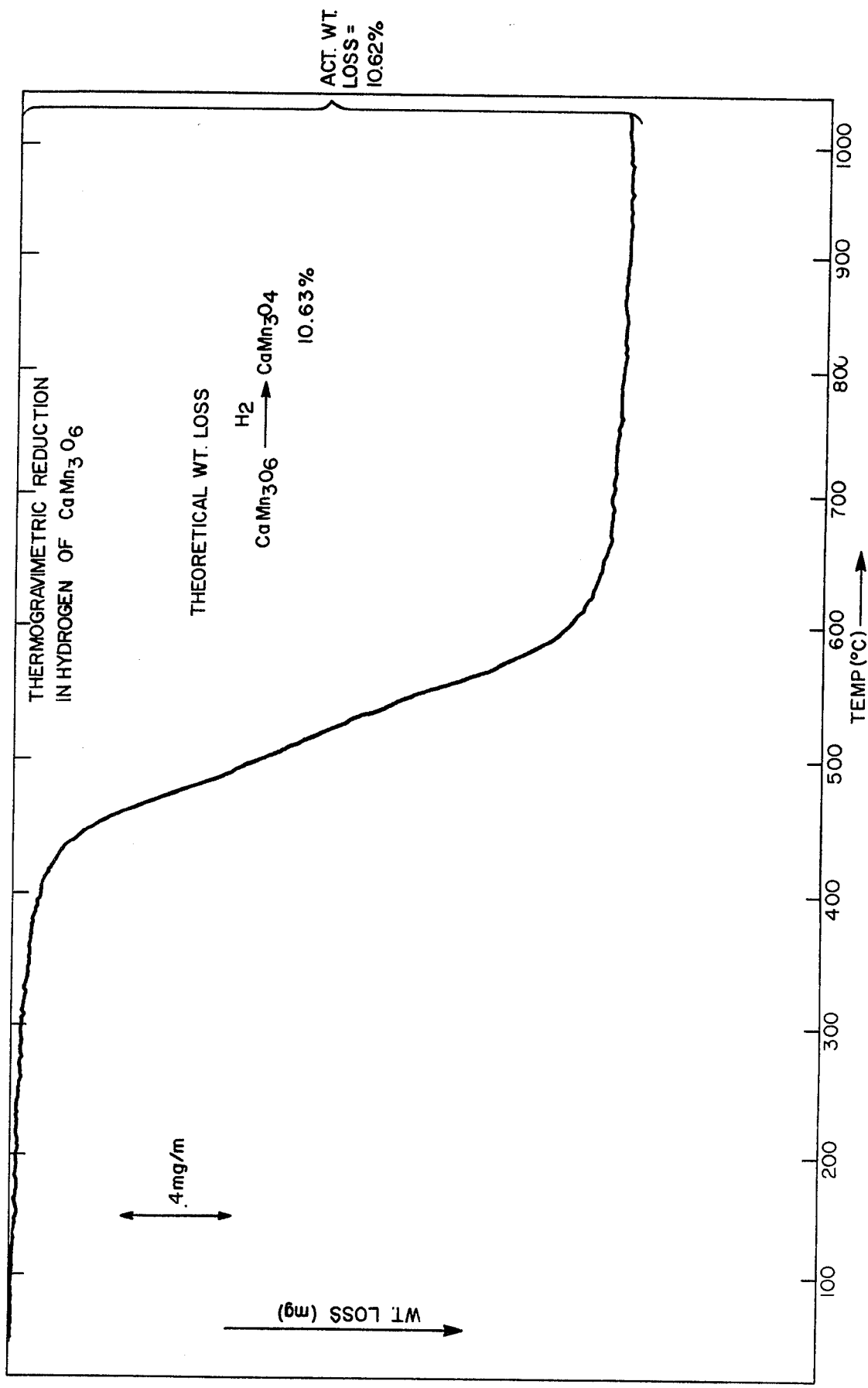
FIG. 1 shows the thermogravimetric reduction of $CaMn_3O_6$ in hydrogen.

Mixed valence mixed metal oxides of the formula $CaMn_3O_6$, $CaMn_4O_8$ and $CaMn_7O_{12}$ are disclosed. They are useful in electrochemical processes. $CaMn_3O_6$ is a mixed valence compound whose formula may be written $Ca[Mn_2^{3+}Mn^{4+}]O_6$. Two-thirds of the Mn are the 3+ valence type. Thermogravimetrically monitored reduction in hydrogen (FIG. 1) to the rock salt crystal structure confirms the above-stated formula. The theoretically calculated weight loss for $CaMn_3O_6 \xrightarrow{H_2} CaMn_3O_4$ is 10.63%. FIG. 1 shows the experimentally determined weight loss to be 10.62%. The thermogravimetric trace of FIG. 1 shows that the material is stable in hydrogen to about 400° C. Its stability in oxygen is to about 925° C. Electrochemical discharge yields a 4 electron reduction per formula unit and the material has been found to be useful as a primary battery cathode, having been discharged as such in 9N KOH at room temperature. Table I presents the X-ray diffraction pattern of $CaMn_3O_6$.

TABLE I

| X-RAY DIFFRACTION PATTERN, $CaMn_3O_6$ | |
|---|---|
| d-spacing(Å) | Relative Intensity |
| 6.06 | W |
| 5.67 | M |
| 4.80 | S |
| 4.53 | S |
| 4.06 | W |
| 3.62 | W |
| 3.53 | M |
| 3.48 | W |
| 3.37 | W |
| 3.03 | W |
| 2.91 | W |
| 2.88 | W |
| 2.83 | S |
| 2.70 | W |
| 2.66 | VS |
| 2.55 | W |
| 2.44 | S |
| 2.41 | M |
| 2.39 | M |
| 2.35 | W |
| 2.34 | W |
| 2.26 | W |
| 2.23 | W |
| 2.22 | W |
| 2.195 | M |
| 2.097 | W |
| 2.034 | W |
| 2.024 | W |
| 1.951 | M |
| 1.828 | S |
| 1.768 | M |
| 1.738 | M |

Figure 2:
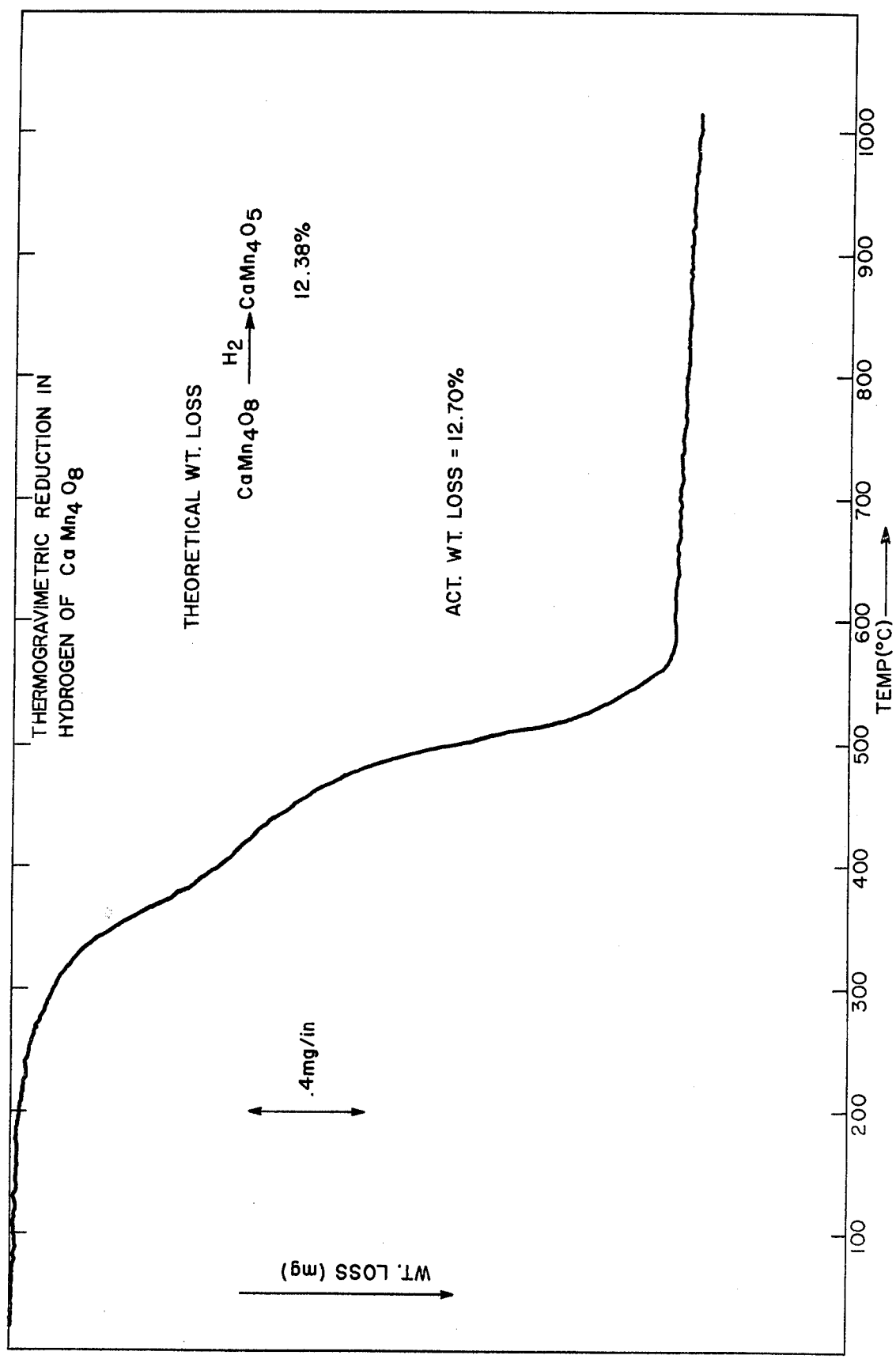
FIG. 2 shows the thermogravimetric reduction of $CaMn_4O_8$ in hydrogen.

VS = Very Strong
S = Strong
M = Medium
W = Weak $CaMn_4O_8$ is also a mixed valence compound whose formula may be written $Ca[Mn_2^{3+}Mn_2^{4+}]O_8$. One half of the Mn are of the 4+ type with the remainder being of the 3+ type. Thermogravimetrically monitored reduction in hydrogen (FIG. 2) to the rock salt structure confirms this formula. The theoretically calculated weight loss for $CaMn_4O_8 \xrightarrow{H_2} CaMn_4O_5$ is 12.38%. FIG. 2 shows the experimentally determined weight loss to be 12.70%. The thermogravimetric trace of FIG. 2 also demonstrates that the compound is stable in hydrogen to about 250° C. Stability in oxygen is to about 900° C. Electrochemical discharge yields a 6 electron reduction per formula unit and the material has been found to be useful as a primary battery cathode, having been discharged as such in 9N KOH at room temperature. Table II presents the X-ray diffraction pattern of $CaMn_4O_8$.

TABLE II

| X-RAY DIFFRACTION PATTERN, $CaMn_4O_8$ | |
|---|---|
| d-spacing(Å) | Relative Intensity |
| 7.08 | W |
| 5.71 | M |
| 5.43 | W |
| 4.67 | S |
| 4.55 | W |
| 4.27 | W |
| 4.00 | W |
| 3.93 | S |
| 3.52 | W |
| 3.37 | W |
| 3.24 | W |
| 3.07 | W |
| 2.85 | M |
| 2.72 | S |
| 2.69 | VS |
| 2.52 | W |
| 2.42 | VS |
| 2.35 | W |
| 2.32 | W |
| 2.29 | W |
| 2.22 | W |
| 2.20 | W |
| 2.19 | W |
| 2.17 | W |
| 2.13 | W |
| 2.11 | M |
| 2.05 | M |
| 2.04 | M |
| 2.01 | W |
| 1.916 | W |
| 1.907 | M |
| 1.829 | W |
| 1.802 | M |
| 1.796 | S |

Figure 3:
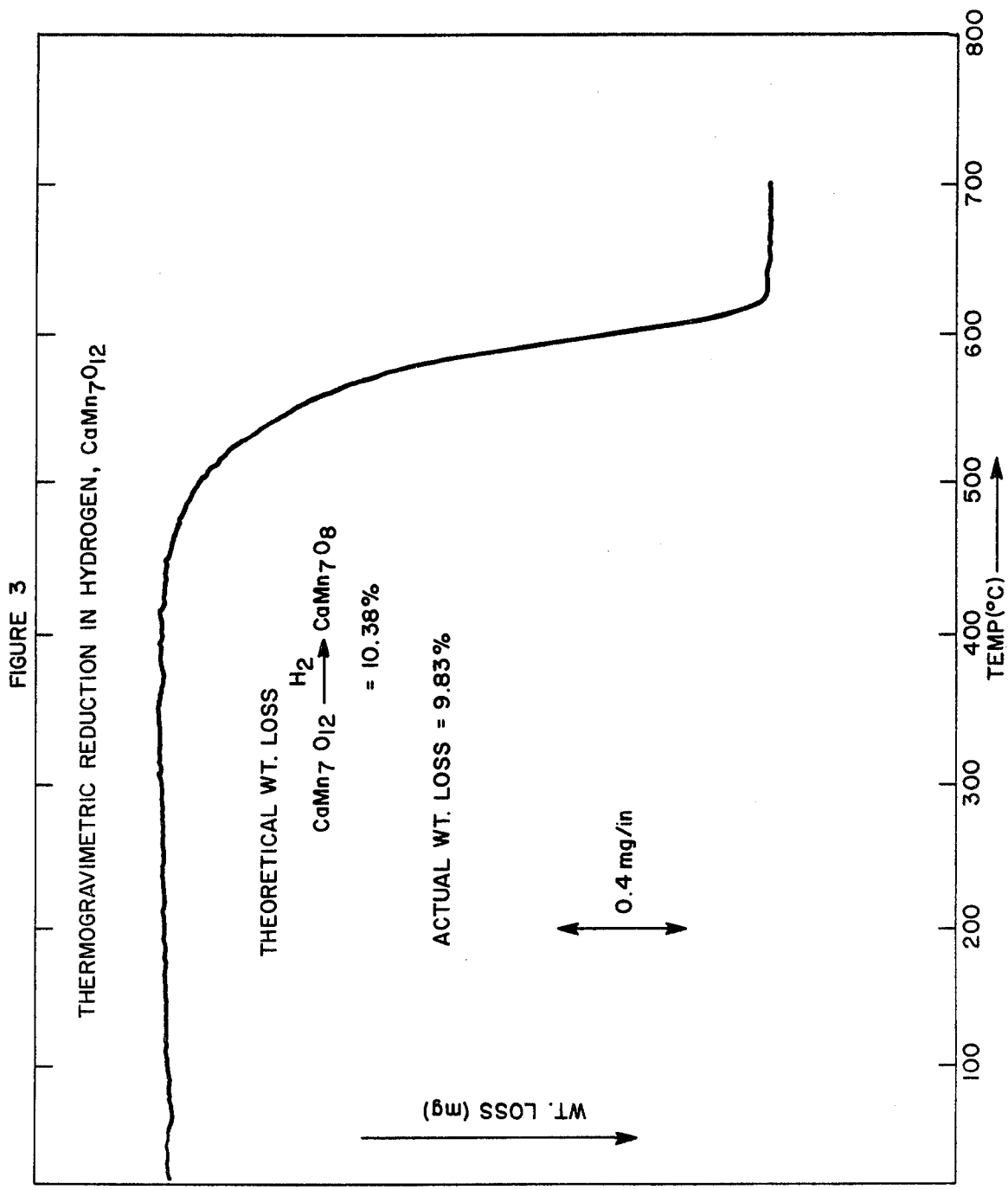
FIG. 3 shows the thermogravimetric reduction of $CaMn_7O_{12}$ in hydrogen.

VS = Very Strong
S = Strong
M = Medium
W = Weak $CaMn_7O_{12}$ is also a mixed valence composition whose formula may be written as $Ca[Mn^{4+}Mn_6^{3+}]O_{12}$. The compound is stable in $H_2$ to about 500° C. and in oxygen to approximately 950° C. Thermogravimetrically monitored reduction in hydrogen (FIG. 3) to the rock salt structure confirms the above stated formula. The theoretically calculated weight loss for $CaMn_7O_{12} \xrightarrow{H_2} CaMn_7O_8$ is 10.38%. The experimentally determined weight loss, as shown in FIG. 3, is 9.83%. Electrochemical discharge yields an 8 electron reduction per formula unit and the material has been found to be useful as a primary battery cathode, having been discharged as such in 9 N KOH at room temperature.

These materials may be prepared by a variety of standard ceramic techniques, among them being heating, in oxygen, a mixture of calcium oxide and manganese oxide, or calcium salt and manganese salt, or calcium oxide and manganese salt or calcium salt and manganese oxide. Most commonly obtained salts of calcium and manganese will be suitable for use in the preparation of these novel compounds with the carbonates, nitrates, acetates and oxalates being preferred and the carbonates and nitrates being most preferred.

The preferred preparative technique, however, involves the decomposition of solid solutions of mixed calcium and manganese carbonates. These solid solutions of mixed calcium and manganese carbonates are prepared by the precipitation from a mixed salt solution of calcium and manganese by the addition of an excess of an appropriate source of carbonate ions such as $(NH_4)_2CO_3$. The metal ion ratio in the mixed metal salt solution is adjusted so that the precipitate which results upon the addition of the source of carbonate ions has the same stoichiometry as the desired oxide. The precipitate is calcined to yield the mixed metal oxide product described. The above preparative technique is more fully described in Ser. No. 684,744, filed May 10, 1976 in the names of L. R. Clavenna, J. M. Longo and H. S. Horowitz, herein incorporated by reference.

The compounds have utility as primary battery cathodes and are also useful as oxygen activating catalysts in applications such as partial oxidation, methanol decompositions and oxygen reduction at a fuel cell cathode.

According to the present invention there is further provided an electrical energy storage device which has a cathode active material selected from the group consisting of the $CaMn_3O_6$, $CaMn_4O_8$ and $CaMn_7O_{12}$. The anode in the electrical energy storage device of the present invention is a metal selected from the group consisting of cadmium, zinc, lead, lithium, sodium and potassium. The electrolyte useful in the present invention includes aqueous electrolytes such as aqueous solutions of potassium hydroxide, sodium hydroxide and ammonium chloride, and nonaqueous or organic electrolytes such as propylene carbonate solutions of alkali metal salts, for example $LiPF_6$.

The materials disclosed in the instant specification, $CaMn_3O_6$, $CaMn_4O_8$ and $CaMn_7O_{12}$ are useful as cathodes and contain cations in high oxidation states that are readily reducible. These materials as the cathode-active materials of the present invention, serve as a solid source of cathodic oxygen.

The cathode structure itself need not necessarily be formed entirely of the cathode active material. Indeed, the cathode-active material may be deposited on an electrode structure such as carbon, copper, nickel and the like. Preferably, however, the cathode structure consists of the cathode-active material in admixture with carbon. The amount of carbon with which the cathode-active material is mixed is not critical; however, in a preferred embodiment of the present invention the weight ratio of active cathode material to carbon is generally in the range of about 10:1 to 1:10 and most preferably in the range of about 2:1 to 1:2.

The electrolyte system employed in the present invention may be aqueous or nonaqueous. A preferred nonaqueous electrolyte is a propylene carbonate solution of an alkali-metal salt such as $LiPF_6$. With zinc and cadmium anodes, aqueous solutions of sodium and potassium hydroxide are particularly preferred as the electrolytes of choice.

In practice this electrical energy storage system will be enclosed in a suitable container fabricated from an inert nonconducting material. When used as a self-contained battery, the system will include said container along with separators, cover ends and current collectors of the type well known in the art.

The following examples demonstrate various methods which may be employed to prepare the desired compounds and also show the unexpectedly superior behavior of the compounds in electrochemical processes.

EXAMPLE 1

An aqueous solution of calcium and manganese is prepared as follows: 0.01 moles of $CaCO_3$ and 0.03 moles of $MnCO_3$ are dissolved in 40 ml. of dilute $HNO_3$ (pH 1-5). The resulting solution is dried for approximately 8 minutes in a microwave oven to yield a black powder which is identified by X-ray diffraction to be $Ca(NO_3)_2 + MnO_2 + Mn_2O_3$. When the mixture is fired for 1 hour at 800° C. in air or oxygen, $CaMn_3O_6$, along with impurity phases, is formed. Continued firing interrupted by frequent re-grinding (either dry or under acetone) will decrease the amount of impurity phases present.

EXAMPLE 2

0.01 moles of $CaCO_3$ and 0.03 moles of $MnCO_3$ are mixed in a mortar and pestle (either dry or under acetone) and fired for 30 minutes at 800° C. in air or oxygen. The mixture is then re-ground (either dry or under acetone) and re-fired at 800° C. for 20 hours. At this point $CaMn_3O_6$ will have been formed. Continued firings interrupted by re-grinds will decrease the amount of impurity phases present and yield $CaMn_3O_6$ as the major phase.

EXAMPLE 3

0.01 moles of Ca acetate and 0.03 moles of Mn acetate are ground dry in a mortar and pestle and then fired for 30 minutes at 200° C. in air or oxygen. The resulting powder is then ground (dry or under acetone) and re-fired for 30 minutes at 800° C. The resulting material is $CaMn_3O_6$ with no second phases present.

EXAMPLE 4

0.01 moles of Ca acetate and 0.03 moles of Mn acetate are dissolved in approximately 40 ml. of dilute acetic acid. This solution is then added to an oxalic acid solution to yield a white precipitate. The precipitate is then fired in air or oxygen for 30 minutes at 800° C. At this point $CaMn_3O_6$ will be present with several impurity phases. Repeated firings at 800° C. and grinding will decrease the amount of impurity phases present.

EXAMPLE 5

A 1:3 Ca:Mn solid solution of calcite precursor is prepared as follows:
Solution 1: 0.0441 moles $CaCO_3$; 0.1500 moles $MnCO_3$.
dissolved in 100 ml. distilled $H_2O$ plus sufficient $HNO_3$ to effect complete solution (pH 1–5).
Solution 2: 1.072 moles $(NH_4)_2CO_3$ dissolved in 500 ml. distilled $H_2O$.
Solution 1 is added to solution 2 with stirring over approximately 2 minutes. The precipitate is then separated from the aqueous phase by vacuum filtration. The precipitate is dried to constant weight in a microwave oven and stored in an inert atmosphere.
The resulting $CaMn_3(CO_3)_4$ solid solution is fired for 30 minutes in air or oxygen, re-ground (either dry or under acetone), and re-fired for 30 minutes at 800° C. The resulting product is $CaMn_3O_6$ with no 2nd phases present.

EXAMPLE 6

0.01 mole of calcium acetate and 0.04 moles of Mn acetate are ground dry in a mortar and pestle and then fired for 30 minutes at 200° C in air or oxygen. The resulting powder is then ground dry and fired for 1 hour in air or oxygen at 800° C. The powder is then fired an additional 66 hours at 800° C with three additional dry grindings. The resulting product is $CaMn_4O_8$ with impurity phases of $CaMn_7O_{12} + Mn_2O_3$.

EXAMPLE 7

A 1:4 Ca:Mn solid solution calcite precursor is prepared as follows:
Solution 1: 0.0375 moles $CaCO_3$, 0.1500 moles $MnCO_3$.
dissolved in 100 ml distilled $H_2O$ plus sufficient $HNO_3$ to effect complete solution (pH 1–5).
Solution 2: 1.072 moles $(NH_4)_2CO_3$ dissolved in 500 ml. distilled $H_2O$.
Solution 1 is added to solution 2 with stirring over approximately 2 minutes. The precipitate is then separated from the aqueous phase by vacuum filtration. The precipitate is dried to constant weight in a microwave oven and stored in an inert atmosphere.
The resulting $CaMn_4(CO_3)_5$ solid solution is fired for 30 minutes at 800° C in oxygen, ground dry in mortar and pestle, and fired an additional 16 hours at 800° C with two more dry grindings. X-ray diffraction indicates that the product is $CaMn_4O_8$ with no second phases.

EXAMPLE 8 — Synthesis of $CaMn_7O_{12}$

A 1:7 Ca:Mn solid solution calcite precursor is prepared as follows:
Solution 1: 0.0214 moles $CaCO_3$, 0.1500 moles $MnCO_3$.
dissolved in 100 ml distilled $H_2O$ plus sufficient $HNO_3$ to effect complete solution (pH 1–5).
Solution 2: 1.072 moles $(NH_4)_2CO_3$ dissolved in 500 ml distilled $H_2O$.
Solution 1 is added to solution 2 with stirring over approximately 2 minutes. The precipitate is dried to constant weight in a microwave oven and stored in an inert atmosphere.
The resulting $CaMn_7(CO_3)_8$ solid solution is fired for 44 hours at 850° C in air with two grindings. At this stage there is a Ca-rich trace impurity phase. An additional 5% by weight $MnCO_3$ is mechanically blended with the already reacted sample and this mixture is fired at 885° C in air for 218 hours with five grindings. The resulting product is $CaMn_7O_{12}$ with no second phases present.

As mentioned previously, the equilibrium decomposition temperature in oxygen of $CaMn_3O_6$, $CaMn_4O_8$ and $CaMn_7O_{12}$ are approximately 925° C, 900° C and 950° C respectively. However, it has been found that subtle changes in the synthesis conditions have profound effects on the resulting products. Lowering the oxygen partial pressure will decrease the temperature of decomposition of each of the compounds. Once the phases have been formed by control of temperature treatment at 1 atm. $O_2$, they can be decomposed by switching to flowing air or more dramatically, by firing in stagnant air. For example, decomposition temperatures of $CaMn_3O_6$ and $CaMn_4O_8$ when fired from mixed carbonates in stagnant air are decreased by 75° C and >100° C respectively, relative to the situation in flowing oxygen atmosphere. The larger decrease in the decomposition temperature for $CaMn_4O_8$ is presumably due to the higher percentage of $Mn^{4+}$ ions (compared to $CaMn_3O_6$) which must be stabilized if the $CaMn_4O_8$ structure is to be maintained.

Residual species can bring about subtle changes in the oxygen partial pressure during reaction which can have rather dramatic effects on the reaction kinetics. Starting with a mixture of acetates rather than carbonates does not lead to single phase products as easily. Presumably, during decomposition of the acetates, a $CO/CO_2$ atmosphere is generated at the reaction interfaces. The initial reducing atmosphere will favor formation of phases with $Mn^{3+}$ which must then back react to form the equilibrium phase. The kinetics for this back reaction are very slow.

In a similar manner, grinding under acetone and then firing causes a sufficiently reducing atmosphere that $CaMn_4O_8$ (which has the highest $Mn^{4+}$ content) cannot be formed. This means that even though the reaction is carried out at the right temperature and oxygen partial pressure, the reaction kinetics for the formation of $CaMn_4O_8$ from its decomposition products ($CaMn_3O_6$ and $CaMn_7O_{12}$) are very slow.

In general, reaction temperatures for forming the compounds $CaMn_3O_6$ and $CaMn_4O_8$ range from a minimum of 600° C. to a maximum subject to the decomposition temperature limitations of the synthesis conditions as discussed in the preceding paragraphs. It is usually preferred to use conditions as oxidizing as possible for the synthesis of $CaMn_4O_8$ (i.e. oxygen rather than air, or flowing air rather than stagnant air, carbonates or nitrates as source materials rather than acetates or oxalates, dry grindings rather than grinding under acetone).

Electrochemical Discharge, $CaMn_3O_6$

The Mn valence distribution of $Ca[Mn_2^{3+} Mn^{4+}]O_6$ indicates that electrochemical discharge to $CaMn_3^{2+}(OH)_8$ should yield a 4 electron reduction per formula unit. The material has been discharged as a primary battery cathode in an electrochemical half-cell using an electrolyte of 9N KOH. In these tests the cathode-active materials were admixed with acetylene black typically in a ratio of 1:1. To this mixture was added enough electrolyte, 60–80 weight %, to form a thick paste. An amount of this paste sufficient to fill the electrode cavity was compressed into a polytetrafluoroethylene cell between a gold current collector and a separator supported by a gold screen. The entire cell with the cathode material in it was weighed in order to determine the amount of material used. The cell was designed such that it could contain from 0.10 to 0.5 g of cathode-active material and that the effective working area of the cathode was 5 cm². A Whatman GF/F glass fiber filter paper was used as the separator. The polytetrafluoroethylene cell containing the cathode material was immersed into 320 ml of electrolyte. The cathode was examined at room temperature using a standard half-cell arrangement with a graphite counter electrode and a saturated calomel reference electrode, SCE. The electrolyte was purged with nitrogen to remove dissolved oxygen. The half-cell was discharged by driving it galvanastatically (at constant current).

EXAMPLE 9 — Electrochemical Discharge, $CaMn_3O_6$

Figure 4:
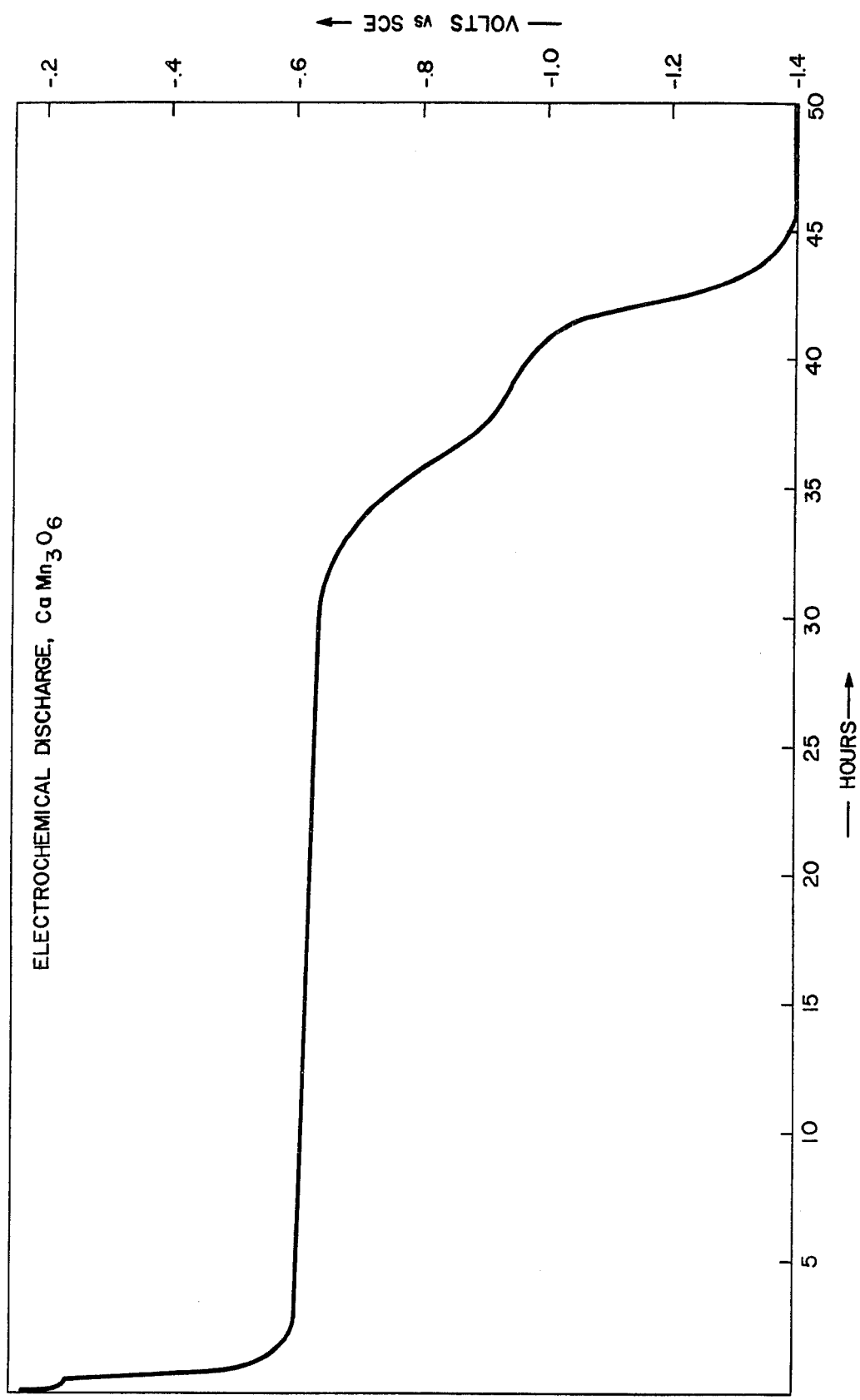
FIG. 4 shows the electrochemical discharge of $CaMn_3O_6$.

Following the general procedures of the preceding paragraph, a half-cell containing 0.1169 g of $CaMn_3O_6$ was discharged to completion at a current density of 0.20 mA/cm². FIG. 4 shows the half-cell potential (vs. SCE) vs. time of discharge.

The discharge was initiated after the open circuit voltage of the material had stabilized at −0.17 V SCE. Upon closing the circuit the voltage dropped rapidly to −0.60 V SCE and stayed fairly level at that voltage for approximately 32 hours. The polarization in this plateau region was found by open circuiting to be 0.06 V. At the end of this plateau region the voltage decreased again going through an inflection at approximately −0.90 V SCE. The discharge was completed at 43.5 hours. If the cathode was fully utilized (4 electron reduction per formula unit), the discharge for the weight of active material used should have been 41.6 hours. Thus the discharge capacity was 105% of the theoretically calculated value. In four experiments similar to the one just described, discharge capacities of 99, 105, 110 and 97% of the theoretically calculated capacities were obtained. This deviation about the 100% value is thought to be due to errors in weighing of the active material. These errors arise because of the fact that not all of the cathode paste that is made is used. Thus, the amount of active material in the electrode must be calculated by using the weighed fraction of the original components. This calculation assumes perfectly homogeneous mixing of the original constituents. This may not be entirely true. In addition, one of the components of the paste (KOH) is volatile, and this can introduce errors.

Electrochemical Discharge, $CaMn_4O_8$

The Mn valence distribution of $Ca[Mn_2^{3+} Mn_2^{4+}]O_8$ indicates that electrochemical discharge to $CaMn_4^{+\lambda}{}_2(OH)_{10}$ should yield a 6 electron reduction per formula unit.

EXAMPLE 10 — Electrochemical Discharge, $CaMn_4O_8$

Figure 5:
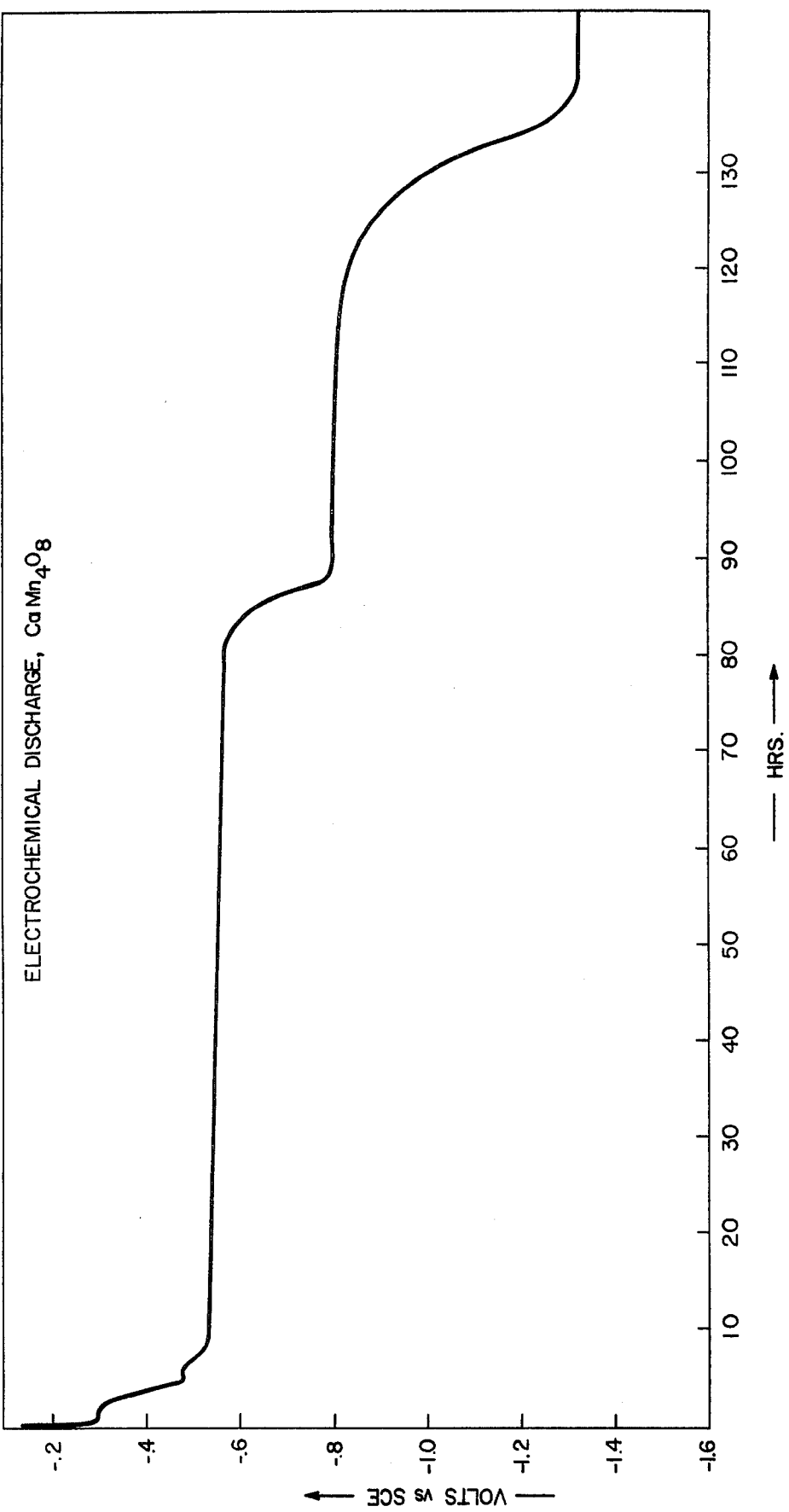
FIG. 5 shows the electrochemical discharge of $CaMn_4O_8$.

A half-cell containing 0.3433 g of $CaMn_4O_8$ was discharged to completion at a current density of 0.20 mA/cm². FIG. 5 shows the half-cell potential (vs SCE) vs time of discharge.

The discharge was initiated from an open circuit voltage of −0.130 V SCE. Upon closing the circuit the voltage dropped rapidly to −0.54 V SCE and stayed in the range −0.54 to −0.56 V SCE for approximately 85 hours. The polarization during this voltge plateau, determined by open circuiting was 0.06 V. After the first plateau the cell voltage decreased to −0.8 V SCE and remained there for close to 35 hours until the cell was fully discharged. If the cathode was fully utilized (6 electron reduction per formula unit), the discharge for the weight of material used should have lasted 142.7 hours. The actual discharge took 135 hours and so the discharge capacity was approximately 95% of the theoretically calculated capacity. In three experiments similar to the one just described, discharge capacities of 95, 103 and 102% of the theoretically calculated capacities were obtained.

EXAMPLE 11 — Electrochemical Discharge, $CaMn_7O_{12}$

The Mn valence distribution of $Ca[Mn^{4+}Mn_6^{3+}]O_{12}$ indicates that electrochemical discharge to $CaMn_7(OH)_{16}$ should yield an 8 electron reduction per formula unit.

Figure 6:
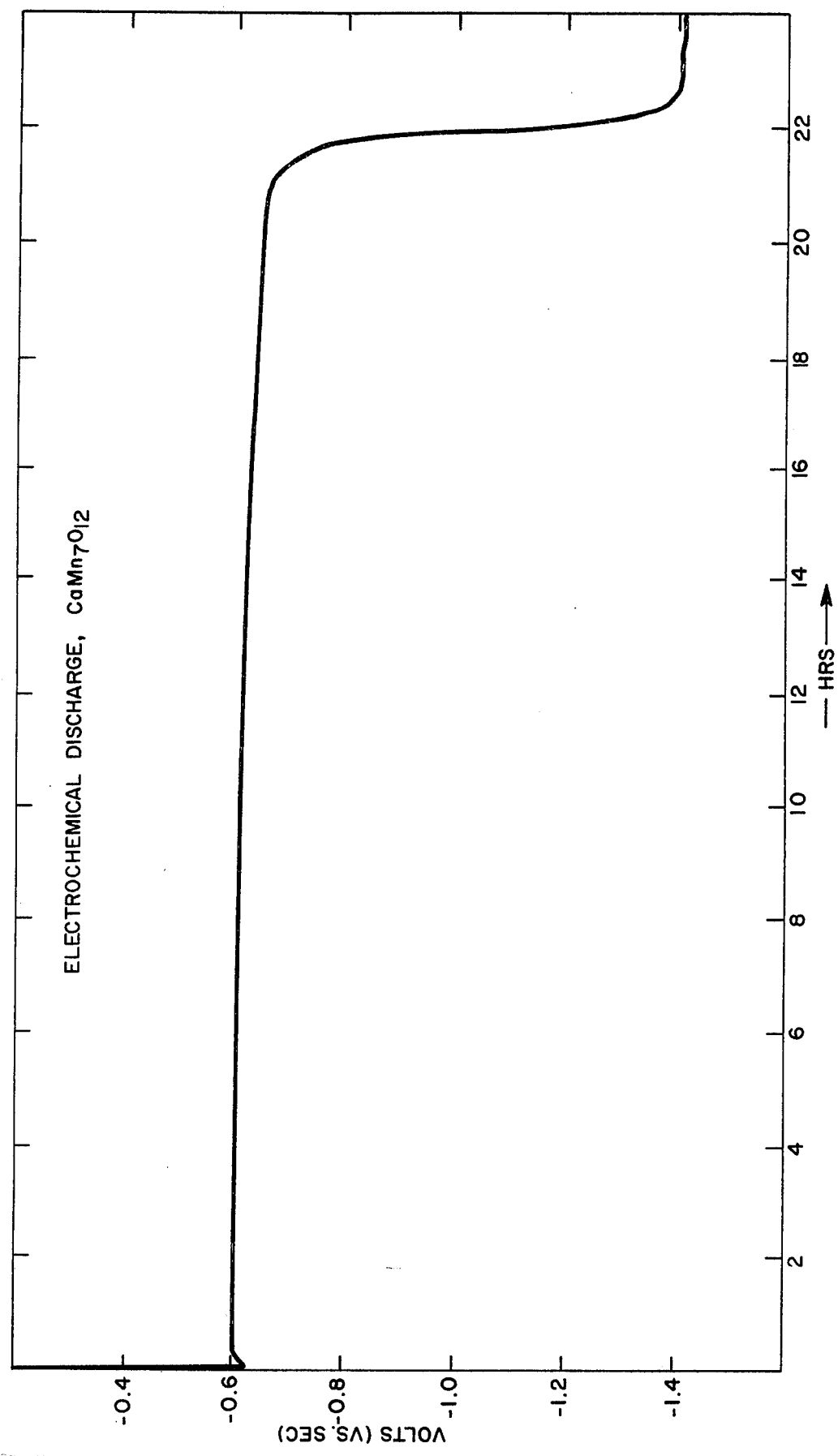
FIG. 6 shows the electrochemical discharge of $CaMn_7O_{12}$.

A half cell containing 0.3347 g of $CaMn_7O_{12}$ was discharged to completion at a current density of 1.0 mA/cm². FIG. 6 shows the half cell potential (vs SCE) vs time of discharge.

The discharge was initiated from an open circuit voltage of −0.216 V vs SCE. Upon closing the circuit, the voltage dropped abruptly to −0.60 V and stayed in the range −0.60 to −0.66 V SCE for approximately 21 hours until the cell was fully discharged. If the cathode was fully utilized (8 electron reduction per formula unit), the discharge for the weight of material used should have lasted 22.96 hours. The actual discharge took 23 hours and so the discharge capacity was approximately 100% of the theoretically calculated capacity.

Electrocatalytic Reduction of Oxygen

Since both $CaMn_3O_6$ and $CaMn_4O_8$ stabilize Mn in mixed valence states they would appear to be promising candidates for oxygen activating catalysts. One such application for which these materials have been evaluated is oxygen reduction at a fuel cell cathode. In these tests the materials were fabricated into test electrodes consisting of the catalyst, a binder, a wet-proofing agent, and a support. Electrodes were made both with and without an electronically conductive filler of acetylene black. Tests showed that the acetylene black did not contribute any activity of its own. Teflon served as both a binder and wetproofing agent for all the electrodes tested. Gold expanded metal screen (Exmet) was used as the support.

Electrodes were fabricated by mixing a weighed amount of material with a few drops of water, adding a measured volume of Teflon 42 suspension, and mixing vigorously to precipitate the Teflon. The gummy product was then spread on a weighed gold Exmet screen and pressed dry between filter paper. The electrode was then cold pressed for 0.5 min., and then hot pressed at 325° C, 500 psi for 0.5 min. After cooling, the electrode was weighed to determine its loading and then placed in the electrochemical cell for testing.

The electrochemical half-cell used for testing was of the interface maintaining type and consisted of a jacketed liquid phase cell compartment and a gas phase cell compartment. The liquid side (3N KOH at 75° C) contains the platinum wire counter electrode, a saturated calomel reference electrode (in contact by Lugin capillary), and magnetic stirrer. The gas side contains the gas inlet and outlet and a stopcock to drain off any condensate. The working electrode is held in place (between the two compartments) between two Teflon disks with a gold current collector pressing against it.

The cell was connected to a Princeton Applied Research Model 173 potentiostat with a programmer and logarithmic current convertor. Outputs of potential and log of current were recorded on an x-y platter, the resulting potential vs log current density plot, referred to as a performance curve, used to evaluate the electrode activity.

EXAMPLE 12

Figure 7:
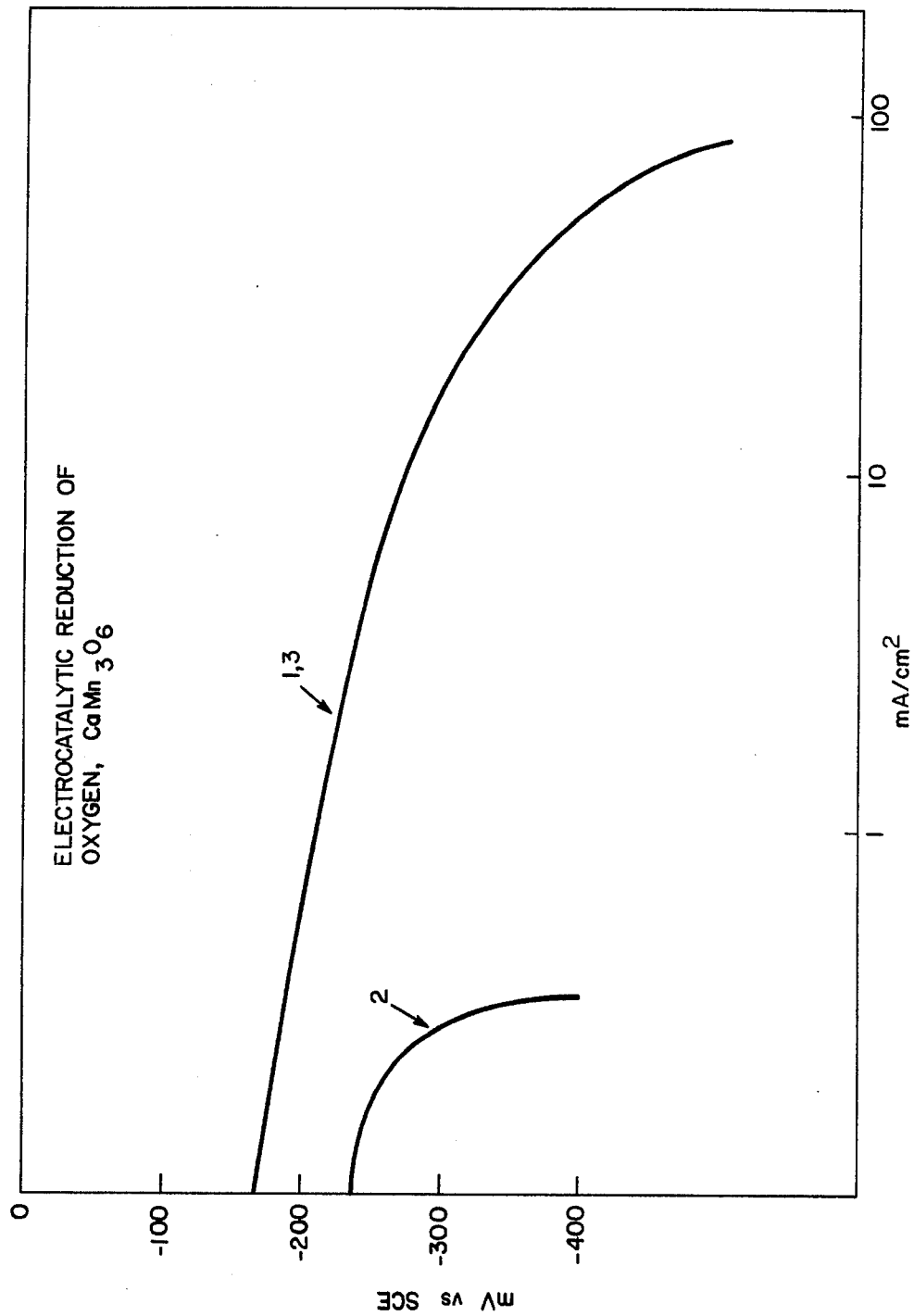
FIG. 7 shows the electrocatalytic reduction of oxygen, $CaMn_3O_6$.

An electrode containing 0.1094 g of $CaMn_3O_6$ mixed with acetylene black in a ratio of 2:1 by weight of cathode active material to acetylene black was evaluated in the fuel cell apparatus described. FIG. 7 shows the resulting performance curves. Curve 1 represents the activity of the electrode when oxygen is continually supplied to it. The open circuit voltage was −135 mV vs SCE. When the half-cell is purged with nitrogen and the performance curve is run with nitrogen continually supplied, the electrode activity is eliminated as shown by curve 2. This demonstrates that the activity exhibited by the electrode in oxygen (curve 1) is truly catalytic in nature (i.e. it is not just the electrochemical reduction of the active material taking place). When oxygen is restored to the half-cell the activity is entirely regained, curve 3 being exactly coincident with curve 1.

EXAMPLE 13

Figure 8:
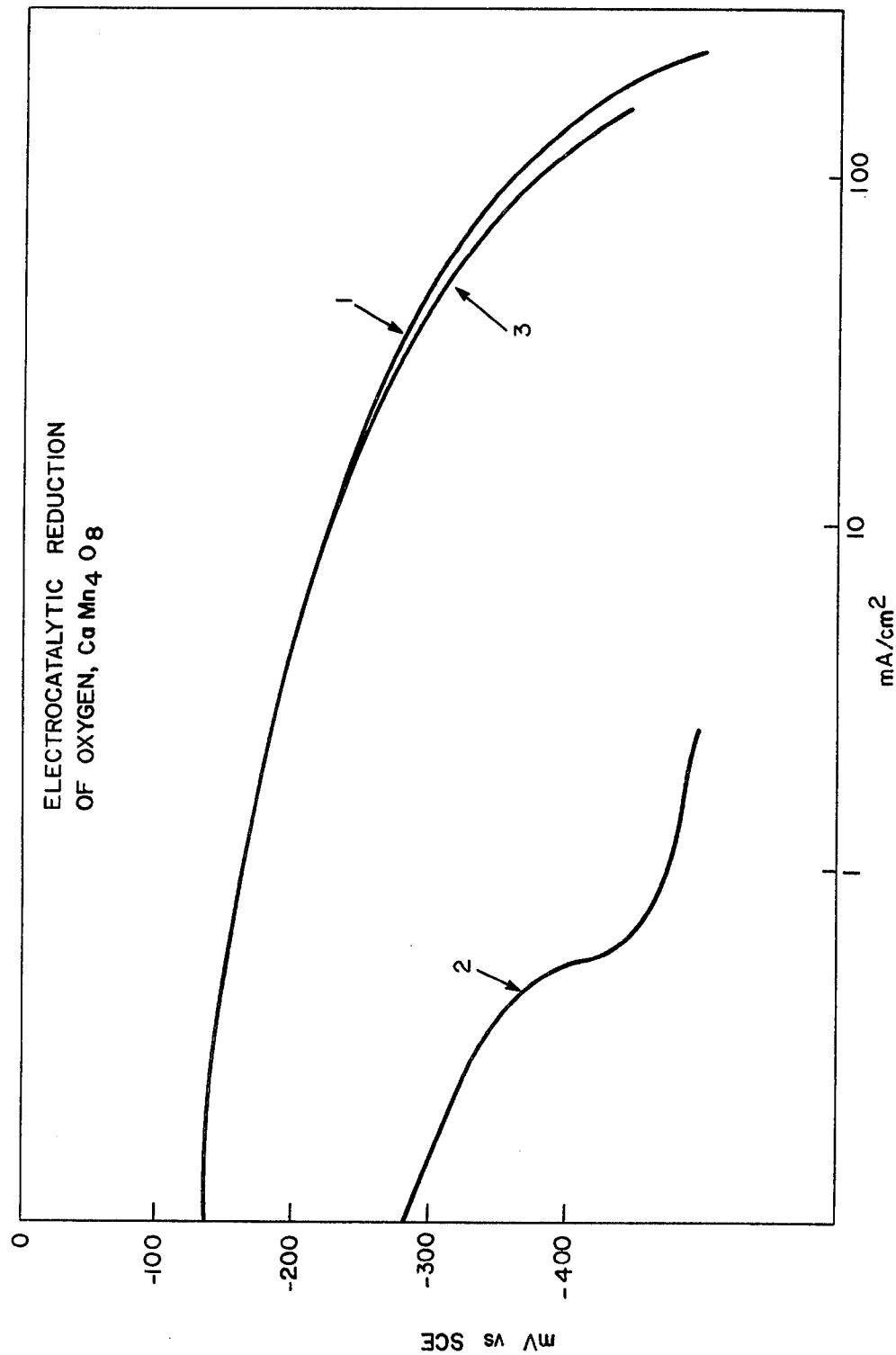
FIG. 8 shows the electrocatalytic reduction of oxygen, $CaMn_4O_8$.

An electrode containing 0.1493 g. of $CaMn_4O_8$ mixed with acetylene black in a ratio of 2:1 by weight of cathode active material to acetylene black was evaluated in the fuel cell apparatus described. FIG. 8 shows the resulting performance curves. Curve 1 represents the activity of the electrode when oxygen is continually supplied to it. When the half-cell is purged with nitrogen and the performance curve is run with nitrogen continually supplied, the electrode activity is eliminated as shown by curve 2. When oxygen is restored to the half-cell, the catalytic activity is entirely regained, curve 3 being almost exactly coincident with curve 1.

The activity of both of these materials exhibited for the electrocatalytic reduction of oxygen suggests that they may be interesting for other applications involving the activation of oxygen-containing molecules such as partial oxidation and methanol decomposition.

What is claimed is:

1. An electrical energy storage system comprising a cathode active material selected from the group consisting of $CaMn_3O_6$, $CaMn_4O_8$ and $CaMn_7O_{12}$ in combination with an anode and an electrolyte.

2. The system of claim 1 wherein the electrolyte is an aqueous base.

3. The system of claim 2 wherein the aqueous base is selected from the group consisting of alkaline metal hydroxide and alkaline earth metal hydroxide.

4. The system of claim 3 wherein the aqueous base is selected from the group consisting of sodium hydroxide and potassium hydroxide.

5. The system of claim 1 wherein the anode is selected from the group consisting of zinc, lead, cadmium, lithium, sodium and potassium.

6. The system of claim 1 wherein the cathode active material is $CaMn_3O_6$.

7. The system of claim 1 wherein the cathode active material is $CaMn_4O_8$.

8. The system of claim 1 wherein the cathode active material is $CaMn_7O_{12}$.

9. The system of claim 1 wherein the cathode active material is mixed with carbon.

10. A battery comprising a container, an aqueous basic electrolyte, a metal anode selected from the group consisting of zinc, lead and cadmium, and a cathode active material selected from the group consisting of $CaMn_3O_6$, $CaMn_4O_8$ and $CaMn_7O_{12}$.

11. A battery comprising a container, a nonaqueous electrolyte, a metal anode selected from the group consisting of lithium, potassium and sodium, and a cathode active material selected from the group consisting of $CaMn_3O_6$, $CaMn_4O_8$ and $CaMn_7O_{12}$.

12. The battery of claim 11 wherein the anode metal is lithium and wherein $LiPF_6$ dissolved in propylene carbonate is the electrolyte.

13. An oxygen reduction electrode selected from from the group consisting of $CaMn_3O_6$ and $CaMn_4O_8$.

14. In processes for the electrocatalytic reduction of oxygen utilizing a cathode active material, the improvement comprising using as the cathode active material, a material selected from the group consisting of $CaMn_3O_6$ and $CaMn_4O_8$.

* * * * *